UNITED STATES PATENT OFFICE.

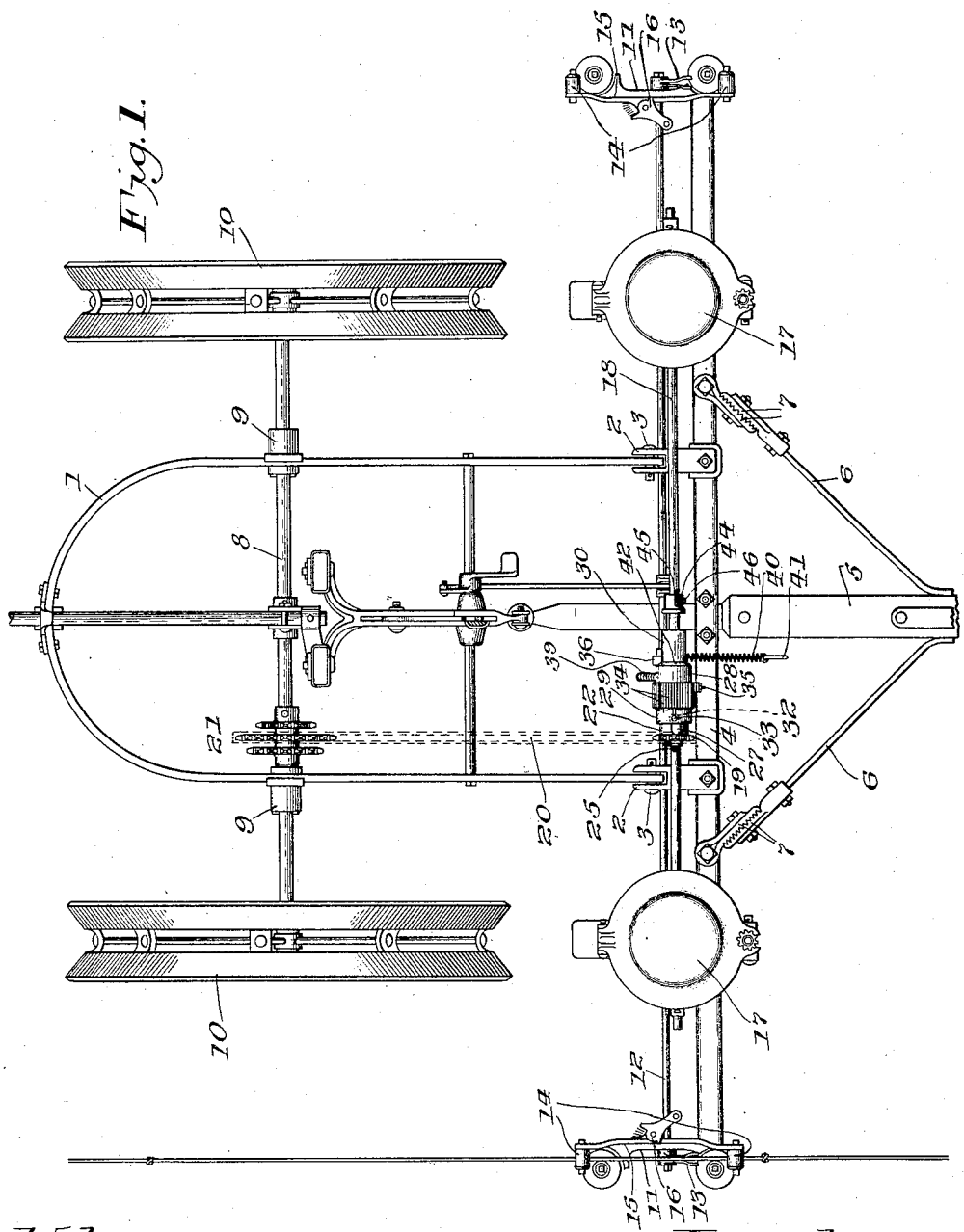

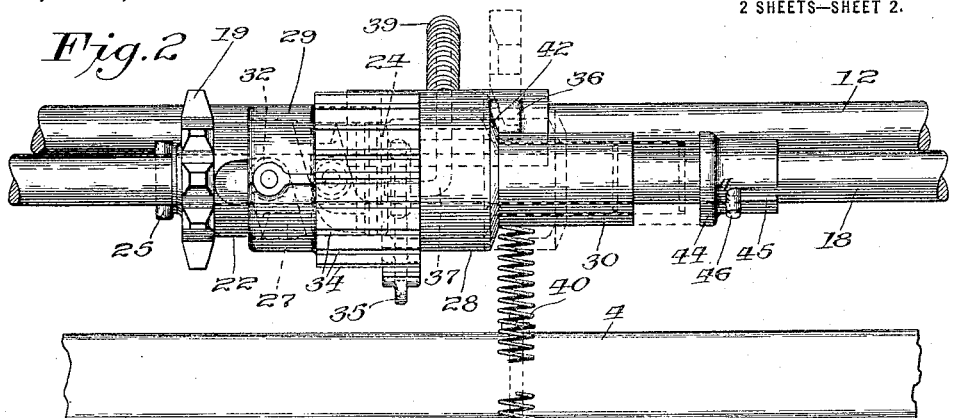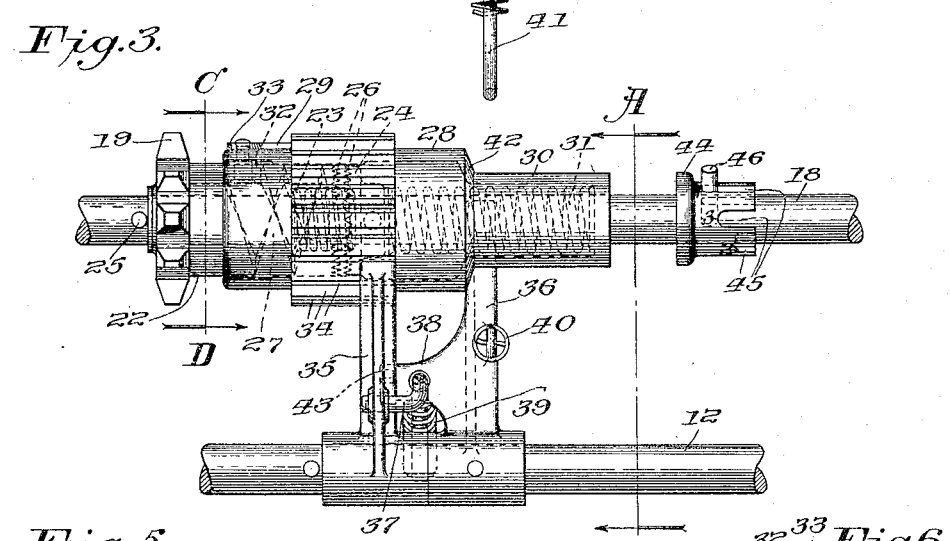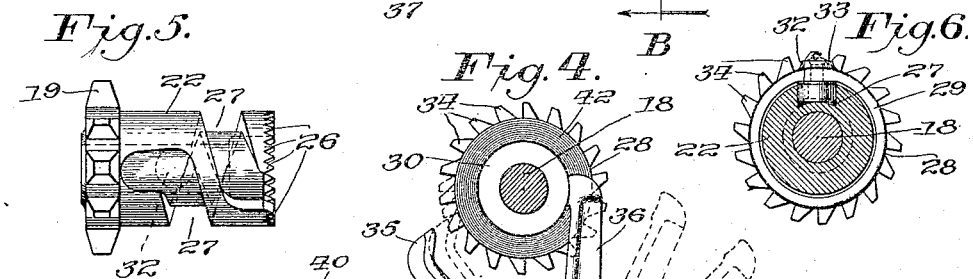

EDWARD W. BURGESS, OF CHICAGO, ILLINOIS, ASSIGNOR TO INTERNATIONAL HARVESTER CORPORATION, A CORPORATION OF NEW JERSEY.

CLUTCH MECHANISM FOR CORN-PLANTERS.

1,215,478.   Specification of Letters Patent.   Patented Feb. 13, 1917.

Application filed April 29, 1914. Serial No. 835,112.

*To all whom it may concern:*

Be it known that I, EDWARD W. BURGESS, a citizen of the United States, residing at Chicago, in the county of Cook and State of Illinois, have invented certain new and useful Improvements in Clutch Mechanism for Corn-Planters, of which the following is a full, clear, and exact specification.

This invention relates to seed planters, and has for its object to simplify and improve the construction and operation of a machine of this class, and in particular the clutch mechanism employed therein for obtaining a variable drop.

Variable drop seed planters heretofore in use have been provided with two distinct types of clutches, one known as a single clutch having its actuations divided into equal parts of one-half revolution or less, with means coöperating therewith for adjusting the clutch to variable periods of movement, the other type being made up of a primary and secondary clutch, the primary clutch having a fixed movement of one complete revolution upon each actuation, and the secondary clutch being for the purpose of dividing this movement in a manner to transmit a whole or any part thereof to the seed dropping elements. The first mentioned type is objectionable for the reason that its operative periods must be limited to one-half revolution or less, hence it is necessary, in order to give the seed plates the desired length of movement, that they be actuated at a speed entirely too rapid to allow the seed kernels to properly settle within the cells. The other type of mechanism is satisfactory in so far as results are concerned, but its construction, owing to the employment of two clutches, is necessarily complicated and expensive. To simplify this latter type of clutch without impairing its operation is a thing to be desired.

My invention, therefore, consists in the employment of a single clutch mechanism capable of imparting a whole or part of a revolution thereof to the seed dropping elements, and one form thereof is exemplified in the following description and illustrated in the accompanying drawings, in which—

Figure 1 is a top plan view of a corn planter having my invention embodied in its construction;

Fig. 2 is a top plan view, on an enlarged scale, of part of Fig. 1, and designed to illustrate the construction and manner of mounting the clutch and its tripping mechanism upon operative parts of the planter;

Fig. 3 is a front vertical elevation of part of Fig. 2;

Fig. 4 is a sectional end elevation of part of Fig. 3 along line A—B and in the direction indicated by the arrows;

Fig. 5 is a detached detail of part of the clutch mechanism; and

Fig. 6 is a cross section of part of Fig. 3 along line C—D and in the direction indicated by the arrows.

The same reference characters designate like parts throughout the several views.

1 represents a U-shaped wheel frame having its side members pivotally connected at their front ends to draft brackets 2 by means of coupling pins 3, the brackets being secured to a transversely arranged draft bar 4, to which is secured the rear end of a draft tongue 5, and 6 represents tongue braces upon opposite sides of the tongue, having their front ends secured to the tongue, and their rear ends adjustably connected with the draft bar by means of toothed plate members 7, whereby the front end of the draft tongue may be adjusted to a higher or lower plane relative to the runner frame of the planter. 8 represents a driving mechanism journaled in bearings 9 secured to the side members of the wheel frame, and 10 represents traction wheels mounted upon opposite ends of the axle. Secured to opposite ends of the draft bar 4 are bracket members 11, having a clutch tripping rock shaft 12 journaled therein. The means for rocking said shaft include a lever 13, having one end secured to the shaft and the opposite end fork-shaped in a manner to receive a check wire, the tappets of which operate to swing the lever at stated intervals in a well-known way as the planter advances, the wire being guided by rollers 14 mounted upon a controlling frame 15 pivotally connected with the bracket in any preferred manner, and 16 represents a common form of spring-pressed detent mechanism that releasably secures the controlling frame in operative position. 17 represents corn receptacles at opposite ends of the runner frame and having intermittently operating seed plates associated therewith that are actuated at predetermined intervals by means including a rotatable seed or feed shaft 18 journaled in bearings carried by the runner frame, the whole constituting seed dropping elements. Means for rotating the feed shaft include a sprocket wheel 19 loosely journaled upon the feed shaft 18 and permitted a limited longitudinal movement thereon, and which may be connected, by means of a drive chain 20, with either of a series of sprocket wheels 21, having variable diameters and secured to the driving axle 8 in a manner to vary the rotative speed of the feed shaft relative to that of the axle as desired within the limits of the mechanism. Integral with the sprocket wheel 19, upon one side thereof, is a sleeve member 22 provided with an axial bore whereby the sleeve and wheel are journaled upon the feed shaft 18. The sleeve is provided with a counterbore that receives a compression spring 23 that is operative between a flanged collar 24, secured to the feed shaft, in a manner to normally hold the sprocket wheel against a stop pin 25 carried by the feed shaft 18. The adjacent ends of the flanged collar 24 and the sleeve member 22 are provided with clutch teeth 26 that engage with each other in a manner to operatively connect the continuously rotatable sprocket wheel 19 with the feed shaft when said wheel and sleeve are moved longitudinally thereon against the expansive force of the spring 23. The sleeve 22 is provided with a spirally disposed channel 27 upon its periphery that is preferably given a pitch of one inch throughout its body portion and is formed approximately parallel at its opposite ends with the axis of the feed shaft, the body portion of the channel extending a short distance beyond one turn of the sleeve for a purpose to be hereafter described. 28 represents a cylindrical shell having one end 29 journaled upon the sleeve 22 and movable longitudinally thereon, the opposite end 30 of the shell having a reduced diameter and provided with an axial bore that slidably and rotatably receives the feed shaft 18 beyond the flanged collar 24, and 31 represents a compression spring encircling the feed shaft within the shell and operative between the fixed collar 24 and the end wall of the reduced portion of the shell to normally separate the collar and shell in a longitudinal direction upon the feed shaft. 32 represents a roller received by the spiral channel 27 and journaled upon a radially disposed stud 33, secured to the side wall of the open end of the part 29 of the shell 28. The central part of the enlarged portion 29 of the shell is provided with a circumferentially disposed series of ratchet teeth 34, and 35 represents a holding pawl freely journaled upon the clutch tripping rock shaft 12 and adapted to periodically engage with the ratchet teeth upon the shell. 36 represents a clutch tripping arm secured to the rock shaft 12 and connected with the pawl 35 by means of a curved link 37, having a laterally turned end that is received by an opening in the pawl, the body portion of the link being slidably received by an eye member 38 integral with the arm 36, and 39 represents a compression spring carried by the free end of the link and permitting a relatively independent angular movement of the pawl and arm. The free end of the arm 36 is normally held in engagement with the periphery of the shell 28, either upon the surface of the enlarged part 29, or upon the reduced portion 30, determined by the position of the shell longitudinally relative to the feed shaft, and by means of a tension spring 40, having one end connected with the arm and its opposite end with a curved rod 41 that is adjustable longitudinally and connected with the draft bar 4, whereby the tension of the spring 40 may be regulated as desired.

In operation the normal position of the parts is as shown in Figs. 3 and 4, with the free end of the arm 36 resting upon the reduced portion 30 of the shell 28 and in engagement with an inclined shoulder 42 between the parts 29 and 30 of the shell, and resisting the force of the spring 31 to move the shell longitudinally upon the feed shaft. When in the position indicated, the arm 36 has disengaged the holding pawl 35 from the ratchet teeth 34 by means of a contact member 43 integral with the arm and engaging the pawl, as shown by full lines in Fig. 4. The sprocket wheel 19 is held against the stop pin 25 by means of the expansive force of the spring 23, and the clutch teeth 26 are thereby disengaged and the sprocket wheel and its sleeve 22 rotate freely upon the feed shaft. When the shell 28 is in the position indicated the roller 32 is positioned in the spiral channel 27, as shown by dotted lines in Fig. 5, and the shell 28 rotates with the sprocket wheel and sleeve until the clutch mechanism is tripped into action by a rocking movement of the tripping rock shaft 12 in a direction to disengage the tripping arm 36 from the shoulder 42 upon the shell 28, and immediately the expansive force of the spring 31 moves the shell longitudinally upon the feed shaft and against the longitudinally adjustable collar 44 carried by the feed shaft. During the initial movement of the tripping arm 36 from engagement with the shell 28 the pawl 35 is not carried into engagement with the ratchet teeth 34 upon the shell, but remains disengaged until the tripping arm has reached a position as shown by dotted lines in Fig. 4, when it contacts with the spring 39, and its further movement as controlled by the check wire swings the pawl 35 into engagement with the ratchet teeth, thereby arresting the rotative movement of the shell 28. The tripping rock shaft is automatically released from the control of the check wire and the arm 36 is returned to its initial position by the reactive force of the spring 40 and rests upon the enlarged cylindrical part 29 of the shell 28. The shell 28 is free to rotate as it is moved longitudinally by the expansive force of the spring 31 and in contact with the adjustable collar 44, and when its rotative movement is resisted by means of the holding pawl 35 engaging with the ratchet teeth 34, the lead of the wall of the spiral channel 27 coacting with the roller 32 will first draw the sprocket wheel 19 in a direction to cause the clutch teeth 26 to engage, the expansive force of the spring 31 being enough greater than that of the spring 23 to cause the shell to remain relatively stationary until the sprocket wheel has reached the limit of its clutch engaging movement, and then the shell will be drawn toward the sprocket wheel until the part 28 of the shell has moved away from the clutch tripping arm 36 and the arm permitted to move toward the axis of the feed shaft and engage with the shoulder 42 upon the shell 28 and release the holding pawl 35 from the ratchet teeth 34. The sprocket wheel 19 will rotate the feed shaft 18 when the clutch teeth 26 are in engagement, and they will remain engaged until the shell 28 has been moved sufficient to permit the tripping arm 36 to hold the shell against the spring 31 and to release the pawl 35 and permit the spring 23 to disengage the clutch teeth 26; the degree of angular movement of the feed shaft when actuated by the clutch mechanism being determined by the extent of longitudinal movement permitted of the shell 28 toward the sprocket wheel 19, and to govern the extent of longitudinal movement of the shell is the function of the adjustable collar 44 upon the feed shaft that limits a longitudinal movement of the shell 28 away from the sprocket wheel 19. The collar 44 is provided with a series of open ended slots 45 disposed parallel with the axis of the feed shaft, their end walls spaced apart at variable distances from the face of the collar, and 46 represents a pin carried by the feed shaft 18 and which may be received by any one of the slots. The spiral channel 27 is preferably given a lead of one inch, and if the collar 44 is adjusted with the pin 46 received by the slot designated by the index number 4, the space between the face of the collar and the end of the shell 28 should be approximately one inch in length when the clutch mechanism is disengaged, and when the clutch mechanism is tripped into action and the clutch teeth 26 are in engagement, the feed shaft will be given one complete revolution before the shell 28 is drawn toward the sprocket wheel 19, a distance of one inch, and permitting the tripping arm 36 to cause a disengagement of the clutch mechanism, and the seed dropping mechanism is thereby actuated in a manner to deliver four kernels. If the collar be adjusted with the pin received by the slot designated by the index number 3, the shell will travel three-quarters of an inch, and the feed shaft will be given three-quarters of a revolution, and three kernels will be delivered. If it be adjusted with the pin received by the slot designated by the index number 2, the feed shaft will be given one-half of a revolution, and two kernels will be delivered; the position of the collar 44 in its longitudinal adjustment upon the feed shaft regulating the degree of angular movement imparted to the shaft by its driving mechanism. Obviously, by substituting collars 44 of different designs, this degree of angular movement may be varied in any manner desired.

Having shown and described a preferred embodiment of my invention, I do not wish that it be confined to the precise details of construction, as many changes may be made in the form, assemblage and proportion of its parts without departing from the spirit of my invention.

What I claim is my invention, and desire to secure by Letters Patent, is:

1. In a seed planter, rotatable seed dropping elements, a clutch mechanism including a constantly rotatable element, intermittently operable means for connecting said rotatable clutch element with said seed dropping elements, and means carried by said rotatable clutch element and operative to control the degree of actuation of said seed dropping elements.

2. In combination, a feed shaft, a constantly rotatable clutch element, intermittently operating mechanism for imparting an aliquant part of a revolution of said clutch element to said feed shaft, and means for controlling said intermittently operating mechanism.

3. In combination, a feed shaft, a clutch mechanism including a constantly rotatable clutch element, intermittently operative mechanism connecting said clutch element with said shaft through an aliquant part of its revolution, and means for controlling an operation of said clutch mechanism.

4. In combination, a feed shaft, a constantly rotatable clutch element, intermittently operating mechanism adapted to connect said clutch element with said shaft for either an aliquant or an aliquot part of a revolution of said clutch element, and means for controlling said intermittently operating mechanism.

5. In a seed planter, a seed shaft, a constantly rotatable clutch element, intermittently operating mechanism adapted to connect said clutch element with said seed shaft for a whole or an aliquant part of its revolution, and means for controlling said clutch mechanism.

6. In a seed planter, a seed shaft, a single clutch mechanism including a constantly rotating member for intermittently imparting a whole or an aliquant or aliquot part of its revolution thereto, and means for controlling said clutch mechanism.

7. In a seed planter, rotatable seed dropping elements, constantly operating driving means directly connectible with said seed dropping elements for intermittently imparting a whole or a part of its revolution thereto, and means carried by said driving means for controlling the degree of actuation of said seed dropping elements.

8. In a seed planter, carrying wheels, seed dropping elements, a driving mechanism operated constantly by said carrying wheels and adapted to be connected directly with said dropping elements at predetermined intervals, and means for varying the period of connection from a whole to three-quarters or one-half of a revolution.

9. In a seed planter, seed dropping elements, continuously rotatable means for driving said seed dropping elements, unitary means for connecting said continuously rotatable means with said seed dropping elements for a whole or part of a revolution, and means carried by said driving means for controlling said connection.

10. In a seed planter, carrying wheels, a feed shaft, rotary driving means carried on said shaft and operated by said carrying wheels, a clutch member on said shaft engageable with the rotary driving means, means for connecting said clutch member and rotary driving means for a whole or part of a revolution, and means carried by said driving means for controlling the connecting means.

11. In a seed planter having a seed dropping element, means for actuating said seed dropping element for variable predetermined periods, said means including a clutch mechanism having both rotatable and reciprocal movements, an intermittently actuated rock shaft, and arms carried on said rock shaft for controlling alternately the reciprocal and rotary movements of said clutch mechanism.

12. In a seed planter having a seed dropping element, the combination of a continuously rotating member, a clutch mechanism for intermittently connecting said seed dropping element with said continuously rotating member, and means associated with said clutch mechanism for effecting the connection, said means being laterally movable and dependent for the period of maintaining the connection upon the length of its lateral movement.

13. In a seed planter having a seed dropping element, means for intermittently actuating said seed dropping element including a clutch mechanism, and connecting means provided with a spiral groove and coacting member for holding said clutch mechanism in engagement for variable periods.

14. In a seed planter, the combination of a seed shaft, clutch members thereon, governing means for said clutch members having a rotative movement and capable of causing engagement of said clutch members when the rotative movement is suspended and permitting disengagement when in rotation, and means for intermittently controlling said rotative movement.

15. In a seed planter, the combination of a seed shaft, clutch members thereon, governing means for said clutch members having a rotative and reciprocal movement and capable of causing engagement of said clutch members during the reciprocal movement and disengagement during the rotative movement, and intermittent means for alternately suspending both of said movements.

16. In a clutch mechanism, an intermittently rotatable shaft, a constantly rotatable clutch member journaled upon said shaft, a clutch member secured to said shaft and normally disengaged from said constantly rotatable member, and clutch controlling means including a rotatable reciprocating member journaled upon said shaft and actuated by said constantly rotatable member.

17. In a clutch mechanism, an intermittently rotatable shaft, a constantly rotatable clutch member journaled upon said shaft and provided with a spirally disposed channel leading longitudinally relative to the axis of said shaft, a clutch member secured to said shaft and normally disengaged from said constantly rotatable member, and clutch controlling means engaging with the spirally disposed channel upon said constantly rotatable clutch member and given intermittent longitudinal angular movement thereon.

18. In a clutch mechanism, an intermittently rotatable shaft, a constantly rotatable clutch member journaled upon said shaft, a second clutch member secured to said shaft and normally disengaged from said constantly rotatable clutch member, a rotatable clutch controlling member carried by said shaft and movable axially thereon toward and from said clutch members, and a tripping arm governing the relative position of said clutch controlling member.

19. In a clutch mechanism, an intermittently rotatable shaft, a constantly rotatable clutch member journaled upon said shaft, a second clutch member secured to said shaft and normally disengaged from said constantly rotatable clutch member, a rotatable clutch governing member carried by said shaft and intermittently movable axially thereon, the length of engagement of said clutch members being regulated by the extent of the axial movement of said clutch governing member.

20. In a clutch mechanism, an intermittently rotatable shaft, a constantly rotatable clutch member journaled upon said shaft and permitted an axial movement thereon, a second clutch member secured to said shaft and normally disengaged from said constantly rotatable clutch member, a rotatable clutch governing member carried by said shaft and movable axially thereon, and means carried by said constantly rotatable clutch member engaging with said clutch governing member in a manner to impart rotative and axial movement thereto.

21. In a clutch mechanism, an intermittently rotatable shaft, a constantly rotatable clutch member journaled upon said shaft and permitted an axial movement thereon, a second clutch member secured to said shaft and normally disengaged from said constantly rotatable clutch member, a rotatable clutch governing member journaled upon said shaft and movable axially thereon, means for controlling the axial movement of said clutch governing member, and a spirally disposed element carried by said constantly rotatable clutch member and leading axially thereof, said spirally disposed element engaging with said clutch governing member in a manner to impart rotative and axial movement thereto.

22. In a clutch mechanism, an intermittently rotatable shaft, a constantly rotatable clutch member journaled upon said shaft and permitted an axial movement thereon, a second clutch member secured to said shaft and normally disengaged from said constantly rotatable clutch member, a rotatable clutch governing member journaled upon said shaft and movable axially thereon, and a spirally disposed element carried by said constantly rotatable clutch member and leading axially thereof, said spirally disposed element engaging with said clutch governing member.

23. In a clutch mechanism, an intermittently rotatable shaft, a constantly rotatable clutch member journaled upon said shaft and permitted a limited axial movement thereon, a second clutch member secured to said shaft and normally disengaged from said constantly rotatable clutch member, an intermittently rotatable clutch governing member journaled upon said shaft and movable axially thereon, means carried by said constantly rotatable clutch member engaging with said clutch governing member in a manner to move it axially and angularly upon said shaft, and a clutch tripping mechanism controlling the operation of said clutch governing member.

24. In a clutch mechanism, an intermittently rotatable shaft, a constantly rotatable clutch member journaled upon said shaft and permitted a limited axial movement thereon, a second fixed clutch member secured to said shaft, a spring operative between said clutch members to yieldingly hold them disengaged, an intermittently rotatable and axially movable clutch governing member journaled upon said shaft, a spring operative between said fixed clutch member and said clutch governing member to yieldingly resist an axial movement of said clutch governing member in one direction, and a clutch tripping mechanism controlling the axial and rotatable movements of said clutch governing member.

25. In a clutch mechanism, an intermittently rotatable shaft, a constantly rotatable clutch member journaled upon said shaft and permitted a limited longitudinal movement thereon, a second clutch member secured to said shaft, a spring operative between said clutch members to yieldingly hold them disengaged, an intermittently rotatable and longitudinally movable clutch governing member journaled upon said shaft, a spring operative between said fixed clutch member and said clutch governing member to yieldingly resist a longitudinal movement of said clutch governing member in one direction, a spirally disposed element carried by said constantly rotatable clutch member and engaging with said clutch governing mechanism in a manner to move it in an opposite direction, and a clutch tripping mechanism controlling the operation of said clutch governing member.

26. In a clutch mechanism, an intermittently rotatable shaft, a constantly rotatable clutch member journaled upon said shaft, a second clutch member secured to said shaft and normally disengaged from said first clutch member, a reciprocating clutch governing member journaled upon said shaft and actuated by said constantly rotatable clutch member, and a clutch tripping mechanism controlling the movement of said reciprocating member.

27. In a clutch mechanism, an intermittently rotatable shaft, a constantly rotatable clutch member journaled upon said shaft, a second fixed clutch member secured to said shaft, a reciprocating rotatable clutch governing member journaled upon said shaft and actuated by said constantly rotatable clutch member, and clutch tripping mechanism operative to intermittently suspend a rotating movement of said clutch governing mechanism and permit a reciprocatory movement thereof.

28. In a clutch mechanism, an intermittently rotatable shaft, a constantly rotatable clutch member journaled upon said shaft, a second fixed clutch member secured to said shaft, a reciprocating rotatable clutch governing member journaled upon said shaft and actuated by said constantly rotatable clutch member, a rock shaft, and independently movable arms carried by said rock shaft, one of said arms controlling a rotary movement of said clutch governing member and the remaining arm a reciprocating movement thereof.

29. In a clutch mechanism, an intermittently rotatable shaft, a constantly rotatable clutch member journaled upon said shaft, a second clutch member secured to said shaft, a reciprocating rotatable clutch governing cylindrical shell journaled upon said shaft and actuated by said constantly rotatable clutch member, said shell being provided with ratchet teeth upon its periphery, a rock shaft, a pawl carried by said rock shaft and adapted to engage with said ratchet teeth at predetermined intervals in a manner to suspend rotary movement of said shell, and an arm carried by said rock shaft and controlling a reciprocating movement of said shell.

30. In a clutch mechanism, an intermittently rotatable shaft, a constantly rotatable clutch member journaled upon said shaft, a second clutch member secured to said shaft, a reciprocating, rotatable, clutch governing, cylindrical shell journaled upon said shaft, said shell being provided with ratchet teeth upon its periphery, a spirally disposed element carried by said constantly rotatable clutch member, said spiral element leading axially relative to said shell and engaging therewith in a manner to transmit a rotary and reciprocating movement thereto, a rock shaft, a pawl journaled in said rock shaft and adapted to engage with the ratchet teeth upon said cylindrical shell at predetermined intervals in a manner to suspend a rotary movement of said shell, and an arm carried by said rock shaft and controlling the movement of said pawl and the reciprocating movement of said cylindrical shell.

31. In a clutch mechanism, an intermittently rotatable shaft, a constantly rotatable clutch member journaled upon said shaft and permitted a limited longitudinal movement thereon, a second clutch member secured to said shaft and normally disengaged from said first clutch member, a reciprocating clutch governing member journaled upon said shaft and actuated by said constantly rotatable clutch member, and means for regulating the extent of the reciprocating movement of said clutch governing member whereby the degree of rotative movement imparted to said intermittently rotatable shaft may be varied.

32. In a clutch mechanism, an intermittently rotatable shaft, a constantly rotatable clutch member journaled upon said shaft and permitted a limited longitudinal movement thereon, a second clutch member secured to said shaft and normally disengaged from said first clutch member, a reciprocating clutch governing member journaled upon said shaft and actuated by said first clutch member, and means adjustable longitudinally upon said shaft and operative to regulate the extent of the reciprocating movement of said clutch governing member whereby the degree of rotative movement imparted to said intermittently rotatable shaft through said clutch mechanism may be varied.

33. In a clutch mechanism, an intermittently rotatable shaft, a constantly rotatable clutch member journaled upon said shaft and permitted a limited longitudinal movement thereon, a second clutch member secured to said shaft and normally disengaged from said first clutch member, a reciprocating, rotatable, cylindrical shell journaled upon said shaft and actuated by said constantly rotatable clutch member, said shell having ratchet teeth upon its periphery, a rock shaft, a pawl journaled upon said rock shaft and adapted to engage with the teeth upon said shell, an arm secured to said rock shaft and yieldingly connected with said pawl, said arm controlling a reciprocating movement of said shell and permitted independent movement relative to said pawl.

34. In a clutch mechanism, an intermittently rotatable shaft, a constantly rotatable clutch member journaled upon said shaft and permitted a limited longitudinal movement thereon, a second clutch member secured to said shaft, a spring disposed between said clutch members and operative to normally disengage them, said constantly rotatable clutch member having a peripheral, spirally disposed channel leading axially thereof, a rotatable, reciprocating clutch governing shell having one end journaled upon said constantly rotatable clutch member and provided with a radially disposed contacting member received by said channel, the opposite end of said shell being reduced in diameter and journaled upon said shaft, a compression spring carried by said shaft and inclosed by said shell and operative between said second clutch member and said shell, longitudinally disposed ratchet teeth upon the periphery of said shell, a rock shaft, a pawl journaled upon said rock shaft and adapted to engage with said ratchet teeth, a clutch tripping arm secured to said rock shaft and yieldingly connected with said pawl, said arm controlling a reciprocating movement of said shell, and means for turning said rock shaft.

In testimony whereof I affix my signature, in the presence of two witnesses.

EDWARD W. BURGESS.

Witnesses:
    CLYDE C. PALMER,
    WILLIAM ELLIS.